(12) United States Patent
Miller et al.

(10) Patent No.: US 6,575,194 B2
(45) Date of Patent: Jun. 10, 2003

(54) ELECTRICAL SIGNAL PASS THROUGH ARRANGEMENT

(75) Inventors: Gary Wayne Miller, Livonia, MI (US); Thomas Dean Barker, Novi, MI (US); Garth James Schultz, Oxford, MI (US); Stephen Alan Carter, Mississauga (CA)

(73) Assignee: Dynetek Industries Ltd., Calgary (CA)

( * ) Notice: Subject to any disclaimer, the term of this patent is extended or adjusted under 35 U.S.C. 154(b) by 167 days.

(21) Appl. No.: 09/781,005

(22) Filed: Feb. 10, 2001

(65) Prior Publication Data

US 2002/0108656 A1 Aug. 15, 2002

(51) Int. Cl.⁷ .................................................. H02G 3/22
(52) U.S. Cl. ..................... 137/560; 174/65 SS; 174/151
(58) Field of Search ...................... 137/560; 174/65 SS, 174/151

(56) References Cited

U.S. PATENT DOCUMENTS

| | | |
|---|---|---|
| 2,294,432 A | 9/1942 | Weidner |
| 2,987,570 A | 6/1961 | Bluth |
| 3,059,210 A | 10/1962 | Luenberger |
| 3,084,210 A | 4/1963 | Bluth et al. |
| 3,109,882 A | 11/1963 | Maltby |
| 3,352,963 A | 11/1967 | Homrig |
| 3,386,072 A | 5/1968 | Chandler |
| 3,520,989 A | 7/1970 | Funk et al. |
| 4,458,108 A | 7/1984 | Kashimoto et al. |
| 4,599,487 A | 7/1986 | Blank et al. |
| 4,967,577 A | 11/1990 | Gartner et al. |
| 5,193,580 A | 3/1993 | Wass et al. |
| 5,197,710 A | 3/1993 | Wass et al. |
| 5,341,844 A | 8/1994 | Wass et al. |
| 5,452,738 A | 9/1995 | Borland et al. |
| 5,458,151 A | 10/1995 | Wass |
| 5,562,117 A | 10/1996 | Borland et al. |
| 5,644,104 A * | 7/1997 | Porter et al. ............. 174/65 SS |
| 6,186,168 B1 * | 2/2001 | Schultz et al. ......... 137/505.25 |
| 6,321,779 B1 * | 11/2001 | Miller et al. ........... 137/505.25 |
| 6,452,099 B1 * | 9/2002 | Miller et al. .............. 174/65 R |

* cited by examiner

Primary Examiner—Gerald A. Michalsky
(74) Attorney, Agent, or Firm—Sean W. Goodwin

(57) ABSTRACT

An arrangement for passing an electrical signal between first and second areas includes a body disposable between the first and second areas and having an aperture. A first sleeve is at least partially disposed in the aperture and defines a first opening. A second sleeve is also at least partially disposed in the aperture and defines a second opening. The arrangement further includes an electrically conductive element having a first portion disposed in the first opening, and a second portion disposed in the second opening.

30 Claims, 2 Drawing Sheets

ELECTRICAL SIGNAL PASS THROUGH ARRANGEMENT

BACKGROUND OF THE INVENTION

1. Field of the Invention

The invention relates to an arrangement for permitting the transmission of an electrical signal between areas of different pressure.

2. Background Art

A need arises in many applications for transmitting an electrical signal between areas of different pressure. In a tank that contains a fluid under pressure, for example, it is often necessary to conduct such a signal into the tank to control a solenoid-operated valve disposed inside the tank. Because the tank must be breached in order to pass a wire through to the valve, some provision must be made for maintaining a seal so as to prevent leakage of contents out of the tank, or to prevent contaminants from passing into the tank.

Various structures are known for establishing such a seal. U.S. Pat. No. 3,352,963, for instance, discloses a fitting including a high pressure side conductor rod and a low pressure side conductor rod that are joined together by a connector, which is received in an insulating sleeve. The sleeve and the connector are disposed within a pair of nested metal sleeves having complementary tapered sealing surfaces and seats. A hollow loading nut houses the sleeves and connector, and draws them together into sealing relation when the nut is threadably secured to a vessel wall. While this fitting is adequate for transmitting an electrical signal between areas of different pressure, the fitting is complex, bulky and costly to produce.

SUMMARY OF THE INVENTION

The invention addresses the shortcomings of the prior art by providing an arrangement for passing an electrical signal between different areas that is simple, compact and inexpensive.

Under the invention, an arrangement for passing an electrical signal between first and second areas includes a body disposable between the first and second areas and having an aperture. A first sleeve is at least partially disposed in the aperture and defines a first opening. A second sleeve is also at least partially disposed in the aperture and defines a second opening. The arrangement further includes an electrically conductive element having a first portion disposed in the first opening, and a second portion disposed in the second opening.

Preferably, each sleeve is non-threadingly engaged with the body. As a result, the sleeves can be provided with a simple, low cost configuration.

The electrically conductive element may be a terminal having a radially extending projection disposed between the first and second portions. The arrangement also preferably includes a seal disposed between the sleeves and engaged with the body and the projection.

The arrangement also preferably includes a first conductive member in electrical communication with the first portion and adapted to extend into the first area, and a second conductive member in electrical communication with the second portion and adapted to extend into the second area.

Further under the invention, an arrangement is provided for passing an electrical signal between a first area having a first pressure and a second area having a second pressure, wherein the first pressure is normally greater than the second pressure, thereby creating a pressure differential. The arrangement includes a body disposable between the first and second areas and defining a passage having a shoulder. A first sleeve is non-threadingly engaged with the body and at least partially disposed in the passage. The first sleeve also defines a first terminal opening. A second sleeve is non-threadingly engaged with the body and disposed in the passage between the first sleeve and the shoulder. Furthermore, the second sleeve defines a second terminal opening. The arrangement also includes a terminal having a radially extending projection and first and second shank sections extending from the projection. The first shank section is disposed in the first terminal opening, and the second shank section is disposed in the second terminal opening. When the terminal is exposed to the pressure differential, the projection is urged toward the second sleeve, thereby urging the second sleeve toward the shoulder.

These and other objects, features and advantages of the invention are readily apparent from the following detailed description of the best modes for carrying out the invention, when taken in conjunction with the accompanying drawings.

DETAILED DESCRIPTION OF THE PREFERRED EMBODIMENT(S)

Figure 1:
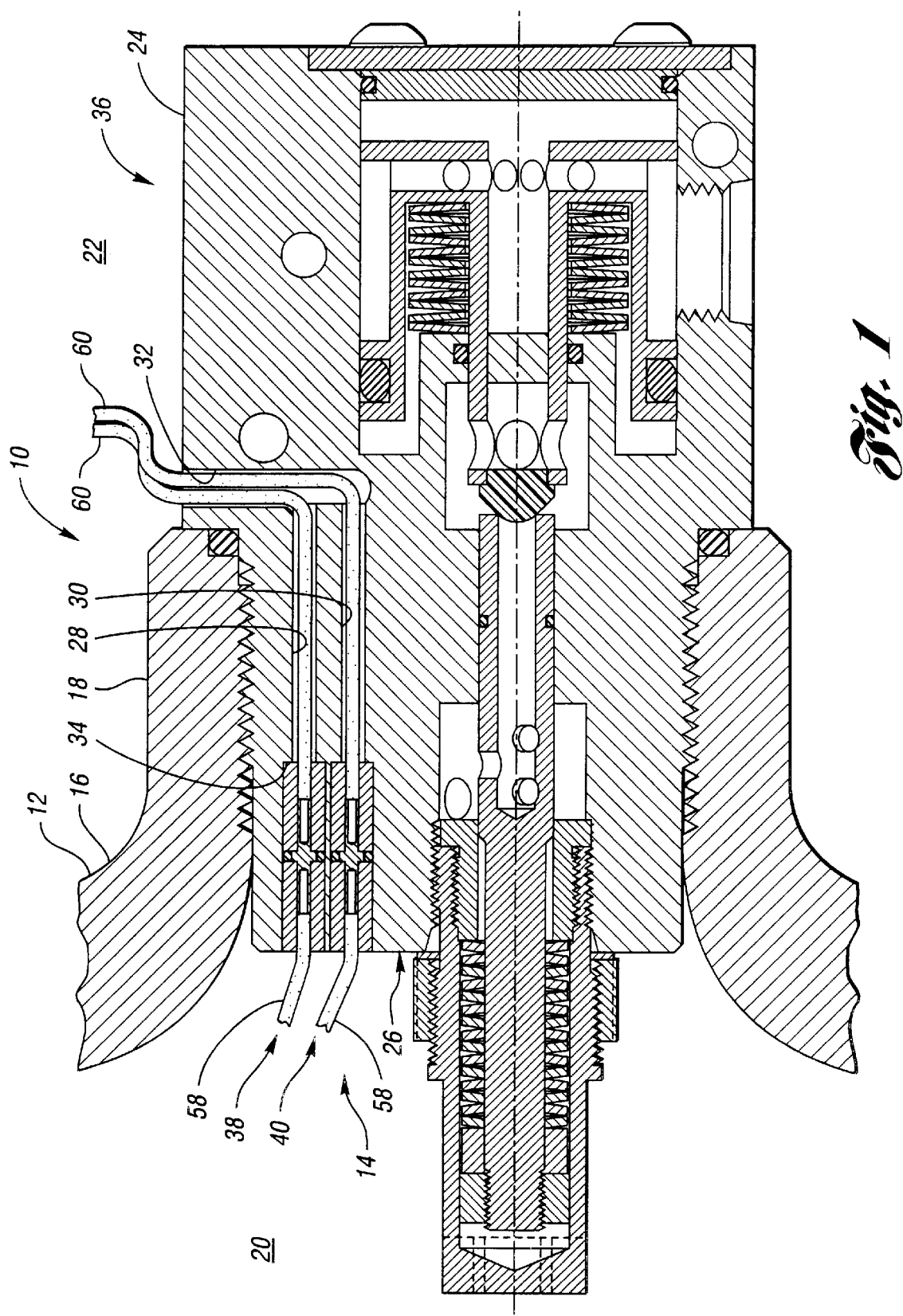
FIG. 1 is a cross-sectional view of a system according to the invention for permitting the transmission of an electrical signal between areas of different pressure, and the system includes a body having first and second apertures, and first and second electrical signal pass through assemblies respectively disposed in the first and second apertures.

FIG. 1 shows a system 10 according to the invention for permitting the transmission of an electrical signal between areas of different pressure. The system 10 includes a vessel such as a tank 12, and an electrical signal pass through arrangement 14 engaged with the tank 12. In a preferred embodiment, the arrangement 14 may be used to transmit an electrical signal to or from a device (not shown) that is contained in the tank 12. For example, the device may be a solenoid-operated valve, a fluid pressure sensor, a fuel temperature sensor, a tank-stress monitor, etc.

The tank 12 preferably houses a pressurized fluid, such as compressed natural gas (CNG), hydrogen, or oxygen, and includes a housing 16 having a neck 18. The housing 16 may comprise any suitable material such as steel, aluminum and/or fiberglass-reinforced plastic. Furthermore, the housing 16 defines a first area or inner side 20 having a first pressure, and a second area or outer side 22 having a second pressure. The second pressure is typically at or about atmospheric pressure, while the first pressure on the inner side 20 is normally much greater. In a preferred embodiment, where the tank 12 contains CNG, the first pressure on the inner side 20 may be in the range of 3,000–5,000 pounds per square inch or greater. As a result, a pressure differential exists between the first and second sides 20 and 22, respectively.

The arrangement 14 includes a first body 24 threadingly engaged with the neck 18 of the tank 12. Alternatively, the first body 24 may be disposed in any suitable aperture in the tank 12. The first body 24 has a first body surface 26 disposed adjacent the inner side 20, and first and second apertures such as first and second passages 28 and 30, respectively, extending from the first surface 26 toward the outer side 22. While the passages 28 and 30 may extend all the way to the outer side 22, in the embodiment shown in FIG. 1, the passages 28 and 30 extend to an outlet passage 32, which extends to the outer side 22. Each passage 28 and 30 also has an engaging portion such as a shoulder 34.

As shown in FIG. 1, the first body 24 is preferably a pressure regulator body of a pressure regulator 36, which regulates outlet pressure of the fluid contained in tank 12. Alternatively, the first body 24 may be any suitable body such as a valve body, end cap, etc.

Figure 2:
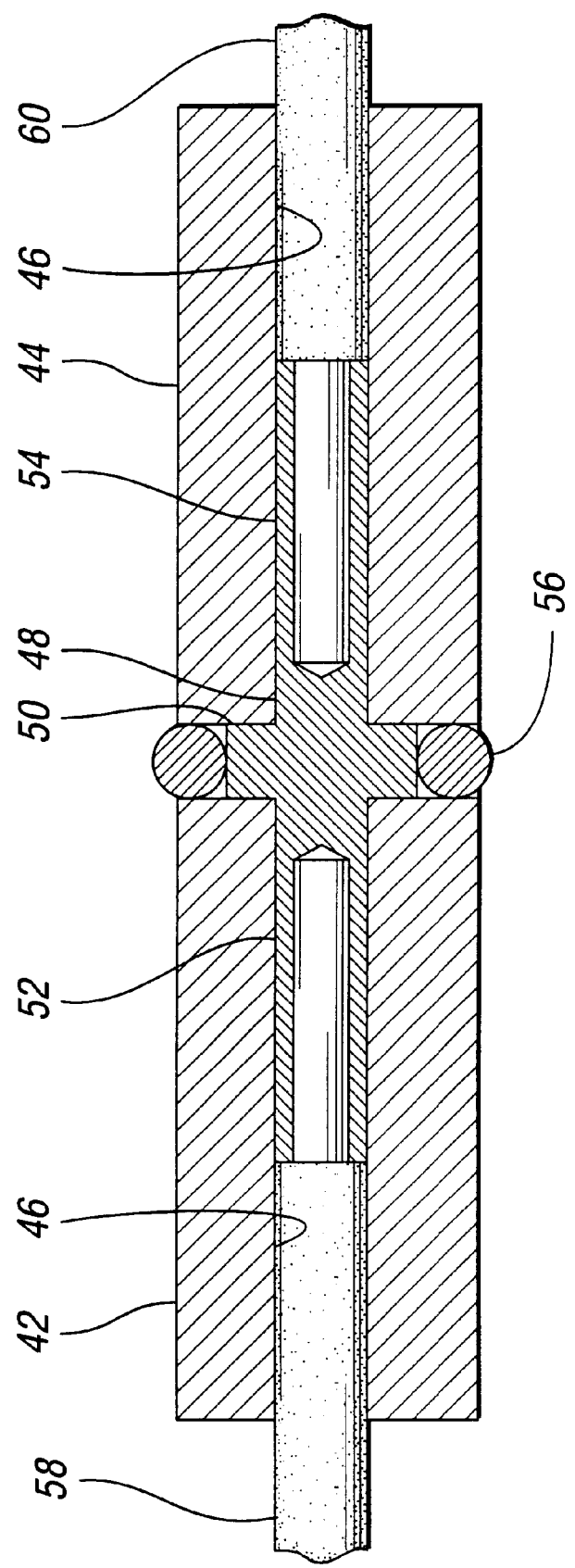
FIG. 2 is an enlarged cross-sectional view of one of the electrical signal pass through assemblies.

The arrangement 14 further includes first and second electrical signal pass through assemblies 38 and 40, respectively, disposed in the first and second passages 28 and 30, respectively. Referring to FIG. 2, each assembly 38 and 40 includes first and second electrically insulating sleeves 42 and 44, respectively, disposed in a respective passage 28 or 30 and non-threadingly engaged with the first body 24. Preferably, but not necessarily, each sleeve 42 and 44 is appropriately sized so as to form an interference fit with the body 24. Each sleeve 42 and 44 also has a opening such as a channel or bore 46. While the sleeves 42 and 44 may comprise any suitable non-conductive material, the sleeves 42 and 44 preferably comprise reinforced nylon, reinforced acetal or other suitable non-conductive plastic.

Each assembly 38 and 40 further includes an electrically conductive, pass-through element, such as a terminal 48. While the terminals 48 may comprise any suitable conductive material, each terminal 48 preferably comprises copper.

Each terminal 48 has a radially extending projection or flange portion 50, and first and second axially extending portions, such as first and second shank sections 52 and 54, respectively, extending from the flange portion 50. Each first shank section 52 is disposed in the bore 46 of a respective first sleeve 42, and each second shank section 54 is disposed in the bore 46 of a respective second sleeve 44. Preferably, but not necessarily, the bores 46 and the terminals 48 are appropriately sized so as to create an interference fit between the sleeves 42 and 44 and the terminals 48.

Each assembly 38 and 40 also includes a seal, such as an O-ring 56, for sealing the passages 28 and 30. Each O-ring 56 is disposed between respective first and second sleeves 42 and 44, respectively, and is engaged with the body 24 and the projection or flange portion 50 of a respective terminal 48. With such a configuration, the O-rings 56 preferably form an interference fit with the body 24 and the terminals 48.

First and second conductive members such as first and second wires 58 and 60, respectively, are connected to each terminal 48. Each first wire 58 extends from a respective terminal 48 into the inner side 20, and each second wire 60 extends from a respective terminal 48 into the outer side 22. While the wires 58 and 60 may be connected to the terminals 48 in any suitable manner, each wire 58 and 60 is preferably inserted into an appropriately sized cavity in a particular shank section 52 or 54. The wires 58 and 60 are then retained in the cavities by crimping the shank sections 52 and 54, or by soldering together the wires 58 and 60 and the shank sections 52 and 54.

To assemble the system 10, the wires 58 and 60 are first connected to the terminals 48. Next, the O-rings 56 are positioned about the flange portions 50 of the terminals 48. The sleeves 42 and 44 are then positioned about the shank sections 52 and 54 of the terminals 48 so as to form the assemblies 38 and 40.

Next the first and second assemblies 38 and 40, respectively, are installed in the first and second passages 28 and 30, respectively, until each second sleeve 44 preferably engages the shoulder 34 of a respective passage 28 or 30. The first wires 58 may then be connected to any suitable device disposed in the tank 12. Next, the first body 24 is threadingly engaged with the tank 12. The second wires 60 may then be connected to any suitable device disposed outside the tank 12, such as a power source (not shown). The tank 12 is then pressurized such as by filling the tank with a compressed fluid.

Because of the interference fit between the various components described above, the sleeves 42 and 44 and the terminals 48 are sufficiently retained in the passages 28 and 30, as the first body 24 is engaged with the tank 12. Advantageously, when the tank 12 is pressurized to the first pressure so as to create the pressure differential between the inner and outer sides 20 and 22, respectively, the pressure differential urges the terminals 48 and the seals 56 toward the outer side 22. In other words, the pressure differential functions to apply a retaining force on the terminals 48 and the seals 56 in the direction of the outer side 22, so as to further retain the second sleeves 44 and the terminals 48 in the passages 28 and 30. More specifically, the pressure differential urges each projection 50 and each seal 56 toward a respective second sleeve 44, thereby urging the second sleeves 44 toward, and into engagement with, the shoulders 34 of the passages 28 and 30.

It should be noted that, depending on the degree of the pressure differential as well as the construction and relative position of the components of the assemblies 38 and 40, the pressure differential may or may not actually cause movement of the terminals 48, seals 56 and/or second sleeves 44. Furthermore, the second sleeves 44 preferably have sufficient strength so that the second sleeves 44 will not creep or otherwise move beyond the shoulders 34 when the assemblies 38 and 40 are exposed to the pressure differential.

While the best mode for carrying out the invention has been described in detail, those familiar with the art to which this invention relates will recognize various alternative designs and embodiments for practicing the invention as defined by the following claims.

What is claimed:

1. An arrangement for passing an electrical signal between a first area having a first pressure, and a second area having a second pressure, wherein the first pressure is normally greater that the second pressure, thereby creating a pressure differential, the arrangement comprising:

a body disposable between the first and second areas and defining a passage having an engaging portion;

a first sleeve engaged with the body and at least partially disposed in the passage between the first area and the engaging portion, the first sleeve defining a first opening;

a second sleeve engaged with the body and disposed in the passage between the first sleeve and the engaging portion, the second sleeve defining a second opening; and an electrically conductive element having a first portion disposed in the first opening, and a second portion disposed in the second opening wherein, when the arrangement is exposed to the pressure differential, the first sleeve is urged toward the conductive element, and the conductive element is urged toward the second sleeve, therby urging the second sleeve toward the engaging portion.

2. The arrangement of claim 1 wherein the body is a pressure regulator body.

3. The arrangement of claim 1 wherein each sleeve is non-threadingly engaged with the body and comprises an electrically insulating material.

4. The arrangement of claim 1 wherein the electrically conductive element is a terminal having a radially extending projection disposed between the first and second portions.

5. The arrangement of claim 4 further comprising a seal disposed between the sleeves and engaged with the body and the projection.

6. The arrangement of claim 1 further comprising a first conductive member in electrical communication with the first portion and adapted to extend into the first area, and a second conductive member in electrical communication with the second portion and adapted to extend into the second area.

7. The system of claim 1 wherein the first and second sleeves are sized so as to form an interference fit with the body.

8. An arrangement for passing an electrical signal between a first area having a first pressure, and a second area having a second pressure, wherein the first pressure is normally greater than the second pressure, thereby creating a pressure differential, the arrangement comprising:
    a body disposable between the first and second areas and defining a passage having a shoulder;
    a first sleeve non-threadingly engaged with the body and at least partially disposed in the passage between the first area and the shoulder, the first sleeve defining a first terminal opening;
    a second sleeve non-threadingly engaged with the body and disposed in the passage between the first sleeve and the shoulder, the second sleeve defining a second terminal opening; and
    a terminal having a radially extending projection and first and second shank sections extending from the projection, the first shank section being disposed in the first terminal opening, and the second shank section being disposed in the second terminal opening
    wherein, when the terminal is exposed to the pressure differential, the projection is urged toward the second sleeve, thereby urging the second sleeve toward the shoulder.

9. The arrangement of claim 8 further comprising a seal disposed between the sleeves and engaged with the body and the projection.

10. The arrangement of claim 8 further comprising a first conductive member in electrical communication with the first shank section and adapted to extend into the first area, and a second conductive member in electrical communication with the second shank section and adapted to extend into the second area.

11. The arrangement of claim 8 wherein the first and second sleeves are sized so as to form an interference fit with the body.

12. A system for passing an electrical signal between areas, the system comprising:
    a housing defining a first area and a second area;
    a body disposable between the first and second areas and defining a passage having an engaging portion;
    a first sleeve engaged with the body and at least partially disposed in the passage between the first area and the engaging portion, the first sleeve defining a first opening;
    a second sleeve engaged with the body and disposed in the passage between the first sleeve and the engaging portion, the second sleeve defining a second opening; and
    an electrically conductive element having a first portion disposed in the first opening, and a second portion disposed in the second opening
    wherein, when the arrangement is exposed to the pressure differential, the first sleeve is urged toward the conductive element, and the conductive element is urged toward the second sleeve, thereby urging the second sleeve toward the engaging portion.

13. The system of claim 12 wherein the housing is a tank, and the body is a pressure regulator body.

14. The system of claim 12 wherein each sleeve is non-threadingly engaged with the body.

15. The system of claim 12 wherein the electrically conductive element is a terminal having a radially extending projection disposed between the first and second portions.

16. The system of claim 15 further comprising a seal disposed between the sleeves and engaged with the body and the projection.

17. The system of claim 12 further comprising a first conductive member in electrical communication with the first portion and adapted to extend into the first area, and a second conductive member in electrical communication with the second portion and adapted to extend into the second area.

18. The system of claim 12 wherein the first and second sleeves are sized so as to form an interference fit with the body.

19. A system for passing an electrical signal between areas, the system comprising:
    a housing defining a first area having a first pressure and a second area having a second pressure, wherein the first pressure is normally greater than the second pressure such that a pressure differential is established between the first and second areas;
    a body engaged with the housing and including a passage disposed between the first and second areas, the passage having a shoulder;
    a first sleeve non-threadingly engaged with the body and at least partially disposed in the passage between the first area and the shoulder, the first sleeve having a first terminal opening;
    a second sleeve non-threadingly engaged with the body and disposed in the passage between the first sleeve and the shoulder, the second sleeve having a second terminal opening; and
    a terminal having a radially extending projection and first and second shank sections extending from the projection, the first shank section being disposed in the first terminal opening, and the second shank section being disposed in the second terminal opening
    wherein, when the terminal is exposed to the pressure differential, the projection is urged toward the second sleeve, thereby urging the second sleeve toward the shoulder.

20. The system of claim 19 further comprising a seal disposed between the sleeves and engaged with the body and the projection.

21. The system of claim 20 further comprising a first conductive member in electrical communication with the first shank section and adapted to extend into the first area, and a second conductive member in electrical communication with the second shank section and adapted to extend into the second area.

22. The system of claim 19 wherein the first and second sleeves are sized so as to form an interference fit with the body.

23. A system for permitting transmission of an electrical signal between areas, the system comprising:
- a tank having a threaded neck and defining a first area having a first pressure, and a second area having a second pressure, wherein the first pressure is normally greater than the second pressure, thereby creating a pressure differential;
- a body threadingly engaged with the neck and defining first and second passages disposed between the areas, each passage having a shoulder; and
- first and second electrical signal pass through assemblies respectively disposed at least partially in the first and second passages, each assembly including first and second electrically insulating sleeves disposed in a respective passage of the body between the first area and a respective shoulder and being non-threadingly engaged with the body, each sleeve defining a bore, each second sleeve being disposed between a respective first sleeve and the respective shoulder, each assembly also including a terminal having a radially extending projection and first and second shank sections extending from the projection, each first shank section being disposed in the bore of a respective first sleeve, each second shank section being disposed in the bore of a respective second sleeve, each assembly further including a seal disposed between respective first and second sleeves and being engaged with a respective projection and the body
- wherein, when the terminals and seals are exposed to the pressure differential, each projection and each seal is urged toward a respective second sleeve, thereby urging each second toward a respective shoulder.

24. The system of claim 23 wherein the first and second sleeves are sized so as to form an interference fit with the body.

25. The system of claim 23 further comprising a first conductive member in electrical communication with the first shank section and adapted to extend into the first area, and a second conductive member in electrical communication with the second shank section and adapted to extend into the second area.

26. An arrangement for passing an electrical signal through a passage in a body separating a first area having a first pressure and a second area having a second pressure, wherein the first pressure is normally greater than the second pressure, thereby creating a pressure differential, the arrangement comprising:
- a first electrically insulative sleeve engaged with the body and at least partially disposed in the passage between the first area and a shoulder formed in the passage, the first insulative sleeve defining a first opening therethrough;
- a second electrically insulative sleeve engaged with the body and disposed in the passage between the first area and the shoulder, the insulative sleeve defining a second opening therethrough to the second area; and
- an electrically conductive element having a flange, a first shank portion disposed in the first opening and a second shank portion disposed in the second opening wherein, when the arrangement is exposed to the pressure differential,
  - the first insulative sleeve is urged toward the second area to engage the flange,
  - the flange of the conductive element is urged toward the second area to engage the second insulative sleeve, and
  - the second insulative sleeve is urged toward the second area to engage the shoulder,
- wherein the electrical signal can pass from the first shank portion in the first area to the second shank portion in the second area.

27. The arrangement of claim 26 wherein the first and second insulative sleeves are an interference fit with the passage.

28. The arrangement of claim 27 wherein the first and second shank portions are an interference fit with the respective first and second openings.

29. The arrangement of claim 26 further comprising a seal disposed about the flange and disposed between the first and second insulative sleeves for forming a seal between the first area, the flange and the second area.

30. The arrangement of claim 29 wherein the first and second shanks are adapted for connection and electrical communication with first and second wires respectively for passing the electrical signal from the first area to the second area.

* * * * *